Aug. 28, 1951    G. L. BURKETT    2,566,054
BALER WIRE TYING MECHANISM
Filed Oct. 10, 1945    4 Sheets-Sheet 1
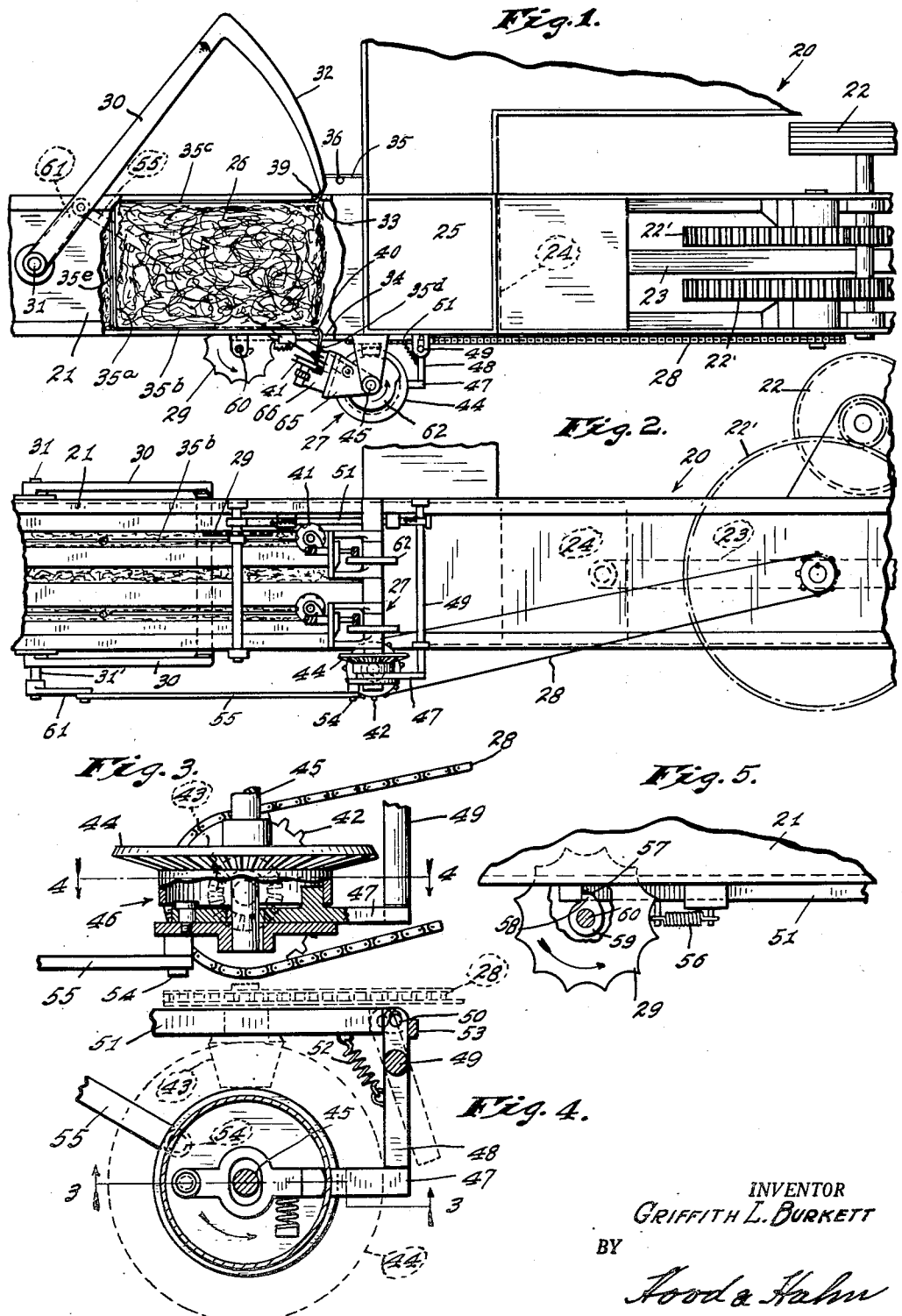
INVENTOR
GRIFFITH L. BURKETT
BY
Hood & Hahn
ATTORNEYS.

Aug. 28, 1951 G. L. BURKETT 2,566,054
BALER WIRE TYING MECHANISM
Filed Oct. 10, 1945 4 Sheets-Sheet 2
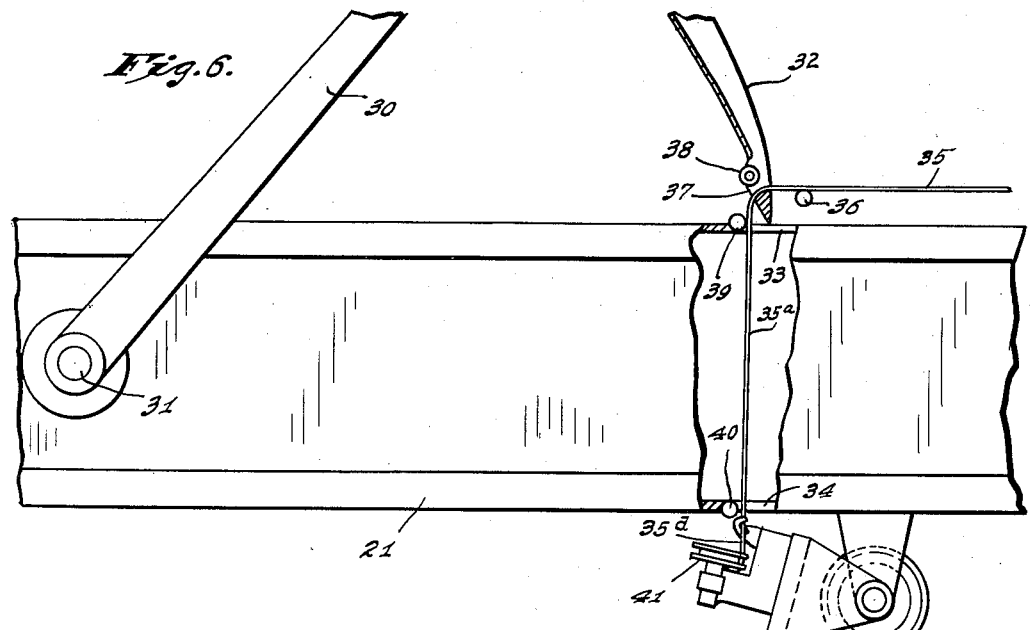
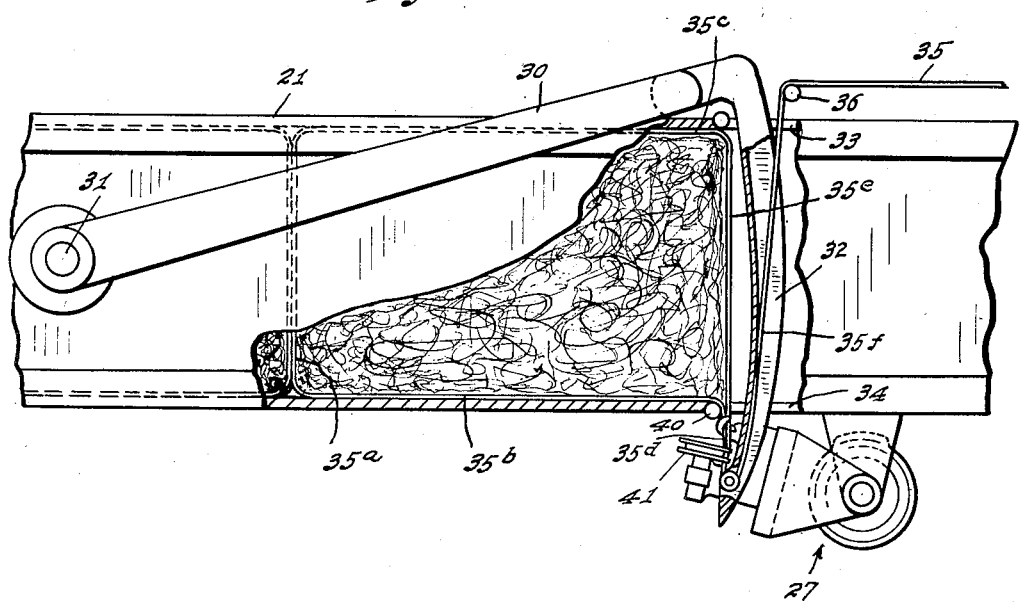
INVENTOR.
GRIFFITH L. BURKETT,
BY
Hood & Hahn
ATTORNEYS.

Aug. 28, 1951  G. L. BURKETT  2,566,054
BALER WIRE TYING MECHANISM
Filed Oct. 10, 1945  4 Sheets-Sheet 3
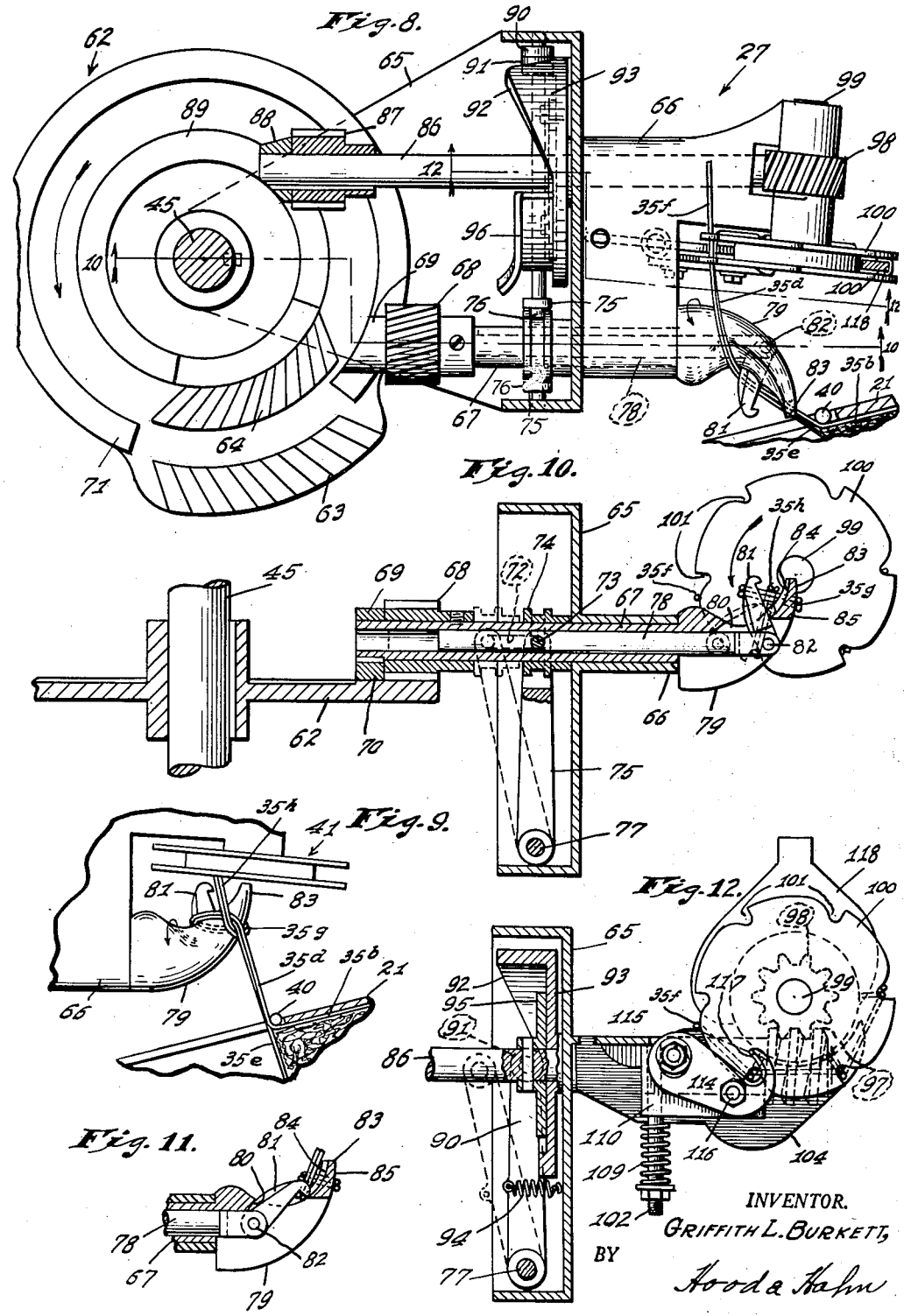
INVENTOR.
GRIFFITH L. BURKETT,
BY
ATTORNEYS.

Aug. 28, 1951 G. L. BURKETT 2,566,054
BALER WIRE TYING MECHANISM
Filed Oct. 10, 1945 4 Sheets-Sheet 4
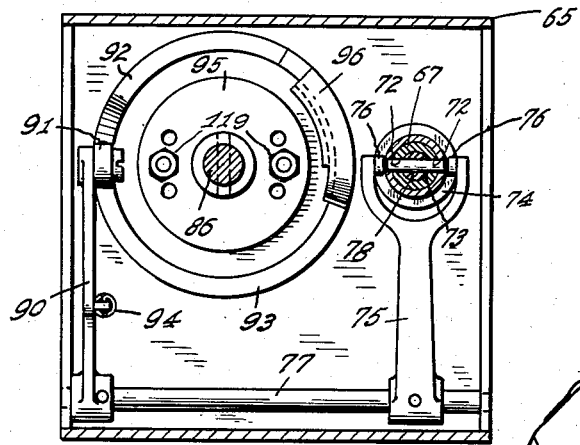
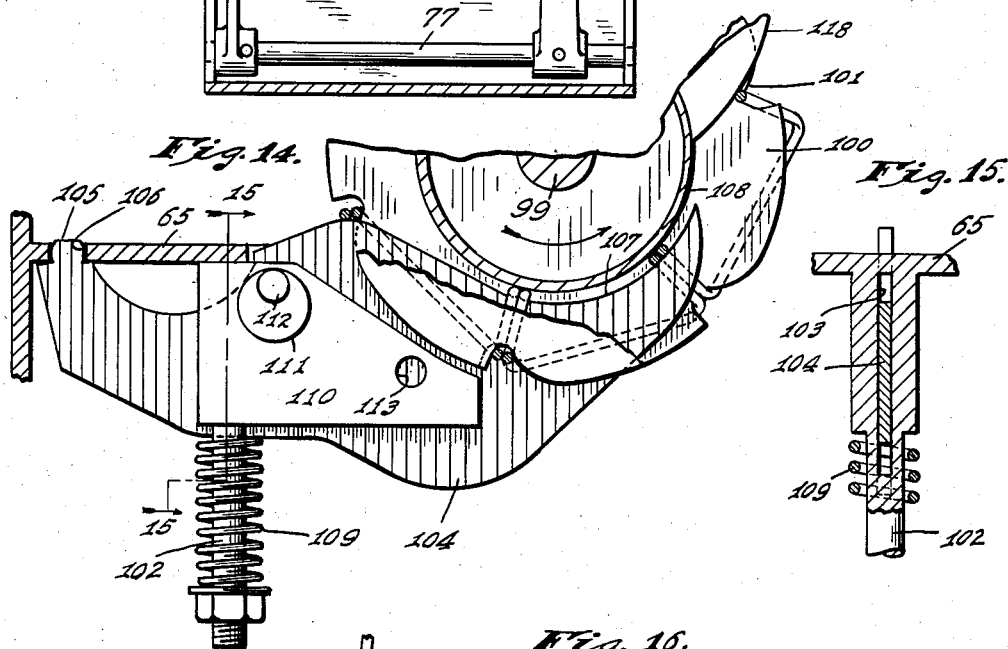
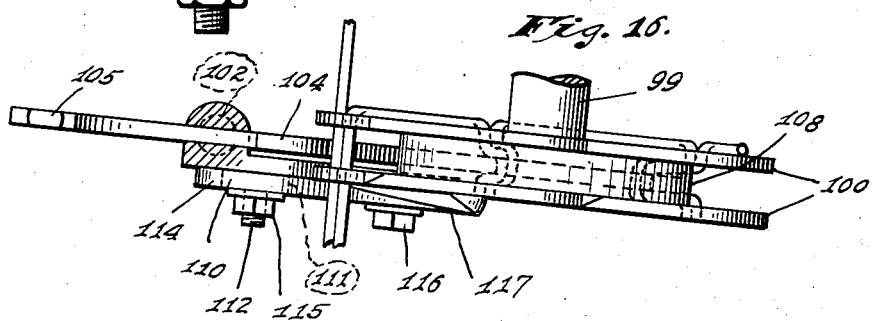
INVENTOR.
GRIFFITH L. BURKETT,
BY
Hood & Hahn
ATTORNEYS.

Patented Aug. 28, 1951

2,566,054

UNITED STATES PATENT OFFICE 2,566,054

BALER WIRE TYING MECHANISM

Griffith L. Burkett, Martinsville, Ind.

Application October 10, 1945, Serial No. 621,485

9 Claims. (Cl. 100—20)

The present invention relates to wire tying mechanism, and it is primarily concerned with the problem of producing a satisfactory tie in baling wire when used to confine a bale of hay, straw, or similar material, before discharging such bale from the baling mechanism. Suitable, and reasonably effective, tying mechanisms have been heretofore known for providing a knot in twine used for a similar purpose; but it has been found that none of those mechanisms will operate satisfactorily upon wire, because of the stiffness of wire as compared to twine. Of course, the advantages of using wire instead of twine for securing a bale of tightly compressed material are obvious, and it has long been the desire of balermen to be provided with means for suitably knotting wire.

Devices whereby the ends of a wire surrounding a bale of material may be twisted together have been known heretofore, but mere twisting does not satisfactorily secure the wire ends together, and furthermore the twisted stubs of wire projecting from the bale have been found to be dangerous inasmuch as persons have frequently been injured by such projections during the handling of the finished bales.

The primary object of the invention, then, is to provide means for tying a suitable knot in baling wire, such means being of such character that the bale is bound in the baling machine, the binding wire is knotted, the wire is then cut, and the bale is discharged from the machine, a new strand of wire being suitably positioned automatically for binding a subsequent bale. Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a fragmentary plan view of a baler with which my tying mechanism is associated;

Fig. 2 is a side elevation of the same fragment of a baler illustrated in Fig. 1;

Fig. 3 is an enlarged detail of a portion of the driving means for my tying mechanism taken on the line 3—3 of Fig. 4;

Fig. 4 is a horizontal section taken substantially on the line 4—4 of Fig. 3;

Fig. 5 is an enlarged fragmentary view of the timing mechanism for my wire tying means, parts being broken away for clarity of illustration;

Figs. 6 and 7 are enlarged fragmentary plan views of a portion of the wire handling mechanism, showing the needle in the position which it assumes immediately before a new bale is started, and in the position which it assumes just as a bale is completed, respectively;

Fig. 8 is an enlarged horizontal section showing certain details of my wire tying mechanism;

Fig. 9 is a fragmentary view thereof, showing the bill hook after it has been rotated to form a loop, and just before it assumes the position in which the end of the wire is to be drawn through the loop;

Fig. 10 is a vertical section taken on the line 10—10 of Fig. 8 and showing the parts in slightly further advanced position;

Fig. 11 is a fragmentary section upon the same plane, showing the parts after the wire has been drawn through the loop;

Fig. 12 is a vertical section taken substantially on the line 12—12 of Fig. 8;

Fig. 13 is a vertical section taken in a plane perpendicular to the plane of Figs. 10 and 12;

Fig. 14 is a further enlarged section of the holding and cutting mechanism taken upon a plane parallel to the plane of Fig. 12;

Fig. 15 is a vertical fragmentary section taken upon the plane indicated by the line 15—15 of Fig. 14; and Fig. 16 is a plan of the parts shown in Fig. 14.

Referring more particularly to the drawings, I have illustrated a part of a standard form of baler, indicated generally by the reference numeral 20, and comprising a baling chamber 21. I have shown a power input pulley 22 connected to drive a bull wheel 22' with which is associated a pitman 23 connected to reciprocate a plunger 24 which moves past a feed opening 25 in the chamber 21 to compact the material 26 to be baled.

Mounted adjacent the feed opening upon one vertical wall of the baling chamber is my wire tying mechanism, indicated generally by the reference numeral 27, and adapted to be driven by a chain 28 which runs over suitable sprockets on the shaft of the bull wheel 22 and on the main shaft of the wire tying mechanism, respectively.

Suitably supported to project into the baling chamber is a star wheel 29, so arranged that, as the material 26 moves past the station of said star wheel, said wheel will be rotated at a rate determined by the rate of movement of such material to measure the amount of material passing such station. A pair of arms 30 are mounted, above and below the baling chamber, to swing upon a journal 31 and on aligned stub shaft 31', said arms carrying one or more needles 32. In the illustrated embodiment of the invention, I have shown an arrangement in which two of such needles are carried by the arms 30, and in which two of my tie mechanisms are provided, it being understood that there will be a needle and a tie mechanism for each strand of wire to be bound around each bale. Since the two needles are identical, and the two tie mechanisms are identical, and since the needles cooperate identically with their respective tie mechanisms, only one such assembly is illustrated in detail and will be described herein.

Each needle is arranged in registry with registering openings in the side walls of the baling chamber, indicated by the reference numerals 33 and 34 in Figs. 1, 6 and 7. A wire 35 leads from a source of supply, such as a spool supported on a suitable journal on the machine (not shown), past a guide pin 36 and through the eye 37 of the needle 32. The wire is threaded through said needle eye, which may be guarded by one or more rollers 38, and thence past a stop pin 39, across the baling chamber 21, past a stop pin 40, and to a holding means, indicated generally by the reference numeral 41, and forming a part of the tying mechanism. The details of the holding means 41 will be particularly described hereinafter.

As is clearly to be seen in Fig. 3, the chain 28 drives a sprocket 42 which carries a beveled gear 43 meshing with a beveled gear 44 loosely mounted upon a vertical shaft 45. Operatively associated with said gear 44 is a single revolution clutch, indicated generally by the reference numeral 46. This clutch includes a part fixed on the shaft 45 and a part engageable with the gear 44, and may be of any standard commercial type, such as the well known Hilliard single revolution clutch. One element 47 of said clutch projects into a position to be blocked by a finger 48, when said finger is in one of its selective positions. Said finger is mounted, intermediate its ends, upon a rock shaft 49, and its opposite end is pivotally associated, as at 50, with a rod 51 which is slidably mounted upon one side of the baling chamber. A spring 52 normally holds the finger 48 in the solid line position illustrated in Fig. 4; and a stop element 53 limits the degree of movement of said finger in a clockwise direction under the influence of said spring. A stud 54 projects downwardly from that element of the clutch 46 which is fixed to the shaft 45, and constitutes a swivel mounting for one end of a pitman 55 whose opposite end is pivotally connected to an arm 61 fixed on the shaft 31' to which the lower arm 30 is fixed. The arrangement is such that, when the clutch 46 acts to clutch the gear 44 to the shaft 45, that portion of the clutch which carries the stud 54 will make one revolution, whereby the arms 30 will be swung, in a clockwise direction, as viewed in Fig. 1, to the position of Fig. 7, and will then be returned to the position of Fig. 1.

A spring 56 normally holds the bar 51 in its position illustrated in Figs. 4 and 5. In that position, a vertical surface 57 near the end of the bar 51 is located in the path of a finger 58 upon a cam 59 carried on the shaft 60 upon which is mounted the star wheel 29. As said wheel is rotated by movement of material 26 through the baling chamber, the finger 58 will be carried into engagement with the surface 57, and will move the bar 51 to shift said bar and the finger 48 into the dotted line position of Fig. 4, thereby releasing the element 47, permitting engagement of the Hilliard clutch, and permitting a single rotation of the shaft 45. Before that rotation is completed, the finger 58 will have dropped off the surface 57, and the spring 56 will have returned the parts to the solid line position of Fig. 4, so that rotation of the shaft 45 will be arrested, by engagement of the element 47 with the finger 48, upon the completion of that single revolution.

Carried upon the shaft 45 (see Figs. 2 and 8) is a gear wheel 62 formed to provide two gear segments 63 and 64 upon separate radii. Mounted adjacent said gear 62 is a bracket 65 to which is secured a housing 66. Journalled in said bracket and said housing is a hollow shaft 67 which carries, at one end, a gear 68 designed and positioned to be engaged and driven by the gear segment 63. Associated with said gear 68 is a wheel 69 having a flat section designed to engage and cooperate with a flat segment 71 upon the gear wheel 62. The parts are so proportioned that, as the gear 62 begins to rotate, from its position illustrated in Fig. 8, in a counter-clockwise direction, the segment 63 promptly comes into engagement with the gear 68 to produce one complete rotation of said gear and the shaft 67, in a clockwise direction as viewed from the left of Fig. 8. Just before the segment 63 moves out of operative engagement with the gear 68, the segment 64 moves into engagement with the gear 87 (later to be described) to produce one complete rotation of said gear 87. The remainder of the rotation of the gear 62 will be accompanied by no further movement of either gear 68 or 87.

Intermediate its ends, the shaft 67 is provided with diametrically aligned longitudinally extending slots 72 through which extends a pin 73, carried by a collar 74 loosely mounted upon the exterior surface of the shaft 67. Said collar is externally grooved for the reception of a pair of pins 76 carried by a lever arm 75 fixed to a rock shaft 77 suitably journalled in the bracket 65.

Reciprocably mounted within the hollow shaft 67 is a rod 78, said rod being provided with a transverse bore in which is mounted the pin 73. It will thus be seen that the rod 78 will rotate with the shaft 67, but that said rod may be reciprocated, within said shaft, by rocking movement of the rock shaft 77.

At its end opposite the end upon which is mounted the gear 68, the shaft 67 carries a bill hook 79 whose general configuration is standard. However, said hook is formed with an opening 80 adjacent the root of its nose 83, and a finger 81, pivotally mounted at 82 upon the extremity of the rod 78, projects through said opening 80 and into cooperation with the curved inner surface 84 of said nose 83. In accordance with standard practice, the nose 83 of the bill hook is turned out of the axis of the shaft 67, and its outer surface 85 is curved in the manner shown.

It will be clear that, when the parts are in the positions illustrated in solid lines in Fig. 10, the finger 81 will be separated from the inner surface 84 of the bill hook nose 83; but that, as the rock shaft 77 is turned in a counter-clockwise direction, the rear surface of the finger 81 will engage the edge of the opening 80 and the finger will thereupon be swung toward the surface 84 of the nose 83, and will be drawn downwardly along that surface toward the root of said surface, to the position illustrated in dotted lines in Fig. 10, and illustrated in full lines in Fig. 11.

Likewise journalled in the bracket 65 and the housing 66 is a second shaft 86 carrying, at one end, a gear 87 for cooperation with the segment 64 of the gear plate 62, and carrying also a wheel 88 having a flat portion for cooperation with the flat surface 89 of the gear plate 62. The rock shaft 77 carries a second arm 90 upon whose extremity is mounted a roller 91 for cooperation with the cam surface 92 of a rotor 93 loosely mounted upon the shaft 86. A spring 94 cooperates with said arm 90 to hold the rock shaft and its associated parts resiliently in the solid line position of Figs. 10 and 12. Fixed to the shaft 86 is a plate 95 provided with means 119 (see Fig. 13) for adjustably frictionally engaging the rotor 93, whereby a drive connection is established between the shaft 86 and the rotor 93. The rotor 93 is further provided with a finger 96 adapted to engage the roller 91 to urge the parts positively into the solid line positions of Figs. 10 and 12.

It will be seen that, as the rotation of the shaft 86 nears its end, the roller 91 will be shifted to the left, by the cam surface 92, to retract the rod 78, and that, as said shaft 86 completes rotation, said roller will be returned to the position of Fig. 8.

The shaft 86 likewise carries a worm 97 arranged to mesh with a worm wheel 98 mounted upon a shaft 99 suitably journalled in the housing 66 and carrying a pair of plates 100 formed with knife-edged notches 101 at suitably peripherally spaced points. The parts now being described comprise the wire holder indicated generally at 41 in Fig. 1.

Depending from the floor of the bracket 65 is a post 102 which is slotted as at 103 to constitute a guide for a plate 104 mounted in said slot. As shown, said plate 104 is provided with a radiused finger 105 engaging in an opening 106 in said bracket floor, so that the plate is rockably supported, by said finger, upon a spring 109 received upon the post 102 and resting at its lower end upon a nut threaded on said post. The plate 104 extends into cooperative relation with the drum 108 connecting the plates 100, and is formed with a surface 107 conforming to the contour of said drum, said surface 107 being resiliently urged toward said drum 108 by the spring 109. Wires received in the notches 101 of the plates 100 are drawn along the surface 107 and crimped about said surface as shown in Fig. 14.

The post 102 integrally supports a plate 110 in which is journalled a button 111 eccentrically carrying a threaded post 112. At a spaced point, the plate 110 is provided with a perforation 113 which is preferably threaded. A knife 114 is perforated for engagement upon the element 112, and is adapted to be held in place thereon by a nut 115. Said knife is formed with an elongated opening through which passes a bolt 116 to engage in the perforation 113 of the plate 110. It will be seen that this mounting makes possible some adjustment of the position of the hooked blade 117 of the knife 114, with respect to the wheels 100.

The operation of the described machine is as follows:

The wire 35 having been threaded into the machine and engaged in one of the notches 101 of the wheels 100, and said wheels having been turned to carry the engaged portions of the wire into a position in which it is crimped about the surface 107 and between the wheels 100, it will be seen that a strand 35a of the wire extends transversely across the baling chamber. As material is fed to the baling chamber and the plunger 24 is reciprocated, that material will engage the wire strand 35a to move the same toward the left through the baling chamber, and to produce a bight of wire, one strand of which extends from the post 40 toward the discharge end of the baling chamber along the adjacent side of the baling chamber, another of which extends across the front end of the bale being formed to the opposite side of the baling chamber, and another of which extends along said opposite side of the baling chamber to the post 39, and thence out to the eye 37 of the needle 32. The portion of the wire extending across the baling chamber will be designated as strand 35a, that portion extending from the post 40 to the strand 35a will be designated 35b, that portion extending from the strand 35a to the post 39 will be designated strand 35c, that portion extending between the post 40 and the holder 41 will be designated strand 35d.

When a sufficient amount of material has been moved past the star wheel 29, the clutch 46 will be tripped. Thereupon, the needle 32 will immediately be swung to the position of Fig. 7, thus carrying a strand of wire, indicated by the reference numeral 35e, across the baling chamber behind the newly formed bale, past the rear surface of the bill hook and the finger 81, and into contact with the peripheral surface of the wheels 100. That strand will usually be laid into the particular notch 101 already occupied by the strand 35d; but if it is not, the first movement of the wheels 100 will shift the strand 35e into the desired notch. Now, the segment 63 of the gear wheel 62 moves into coactive engagement with the wheel 68, and the bill hook begins to rotate in the direction indicated by the arrow in Fig. 8. Its nose promptly engages that portion of the strands 35d and 35e lying between the bill hook and the baling chamber, in the manner illustrated in Fig. 8. As the shaft 67 continues to rotate, the wire is wrapped about the finger 81 and the bill hook nose 83, so that a loop 35g is formed, as the shaft 67 completes 270 degrees of rotation and reaches the position shown in Fig. 9. Meantime, the gear 87 has been engaged by the gear segment 64 to begin the rotation of the shaft 86, and, at this point, both wires are tightly gripped between the near wheel 100 and the plate 104, and the finger 96 is engaging the roller 91 to prevent the movement of the rock shaft 77 out of the solid line positions of Figs. 10 and 12.

As the shaft 67 completes its rotation, the portion 35h of the two wire strands is brought between the finger 81 and the inner surface 84 of the bill hook nose 83, in the manner clearly appreciable from a consideration of Fig. 9. At this instant, the roller 91 begins to ride up on the cam surface 92, whereby the finger 81 is rocked substantially into contact with the bill hook surface 84, thus engaging over the portion 35h. As the mechanism thus begins to retract the rod 78, the wheels 100 bring the wire portions engaged in the appropriate notch 101 into contact with the knife edge 117; and as retraction of the rod 78 continues, to draw the end of the finger 81 downwardly along the surface 84, the wires are cut, and the wire ends are drawn through the loop 35g, in the manner illustrated in Fig. 11.

At substantially this same time, the arms 30 are returned from the position of Fig. 7 to the position of Fig. 6. Obviously the portion of the wire on that side of the knife 114 remote from the baling chamber 21 will be retained by the other wheel 100 of the holder 41; so that, as the needle swings back to the position of Fig. 6, the end of the wire is held in the holder, and the strand 35*f* of the wire is drawn across the baling chamber to occupy the position of the strand 35*a* in Fig. 6. Reference to Fig. 10 will show the relative position of said wire strand on the holder 41.

Thus, the machine is prepared to begin the formation of a new bale, which will be completed and tied in the same manner.

A piece of wire extending from that notch 101 by which the cut was made, between the near wheel 100 and the plate 104 up over the edge 107 of said plate, and thence between said plate and the far wheel to the corresponding notch of said far wheel, cut from the strand 35*d*, will remain on the holder 41 as that section of the holder moves past the knife 114. Such wire sections are to be perceived in Figs. 12, 14 and 16. Positioned between the wheels 100 and above the drum 108 is a stripper plate 118 so proportioned and designed that it will be straddled by such wire section as such portion of the holder comes into registry therewith, whereby such wire section will be forcibly stripped off the wheels 100 and dropped away from the machine.

While the mechanism disclosed herein is, in many particulars, closely similar to previously known tying mechanisms used for knotting twine, it has been found in practice that such previously known mechanisms are almost completely inoperative when wire is threaded into them, whereas my provision of means for positively pulling the portion 35*h* of the wire down through the loop 35*g* renders the mechanism effective to produce a proper knot in baling wire with invariable effectiveness. So far as I am advised, I am the first to have conceived means for automatically and positively pulling the end of the wire through the loop before the loop is permitted to slide over the nose of the bill hook.

I claim as my invention:

1. Wire tying mechanism comprising a bill hook adapted to be rotated about an axis and having a nose turned out of said axis, a reciprocator mounted to rotate on said axis with said bill hook, means for shifting said reciprocator longitudinally of said axis relative to said bill hook, power-actuated means for rotating said bill hook and reciprocator, a finger pivotally mounted on said reciprocator with its free end adjacent the inner surface of said nose, and means cooperating with said finger, upon shifting of said reciprocator in one direction, to force said finger end to engage and scrape along said inner surface of said nose from a point near the extremity of said nose toward the root of said nose.

2. In a wire tying mechanism, a bill hook comprising a hollow shaft and a nose turned out of the axis of said shaft, said shaft being provided with an opening adjacent the root of the inner surface of said nose, a rod reciprocably mounted in said hollow shaft, a finger pivotally carried on said rod and projecting through said opening into cooperative relation with said inner surface of said nose, means for rotating said shaft, and means synchronized with said rotating means for retracting said rod as said shaft approaches the end of a rotation, whereby said finger engages an edge of said opening, is swung about its pivotal mounting toward said inner surface of said nose, and is drawn along said surface toward the root of said surface.

3. A wire tying mechanism, for use with a bale tier of the type including a baling chamber, a wire holder at one side of said chamber, a needle whose point normally lies at the other side of said chamber, a source of wire supply, such wire extending from said source over a support on said needle point, across the interior of said chamber, to said wire holder, means to force material to be baled to flow longitudinally through said chamber carrying with it the portion of said wire traversing said chamber to form a bight of wire within said chamber, means actuated by movement of material through said chamber by said forcing means to cause said needle to traverse said chamber to lay a strand of wire across the trailing end of a formed bale and to engage said strand in said holding means, means for moving said holding means after such strand has been laid, and means to retract said needle after initiation of movement of said holding means whereby a different strand of wire is laid in a newly-presented portion of said holding means, said wire tying mechanism comprising a bill hook including a hollow shaft and a nose turned out of the axis of said shaft, said hook being located between said holding means and the adjacent side of said chamber, said shaft being provided with an opening adjacent the root of the inner surface of said nose, a rod reciprocably mounted in said hollow shaft, a finger pivotally carried on said rod and projecting through said opening into cooperative relation with said inner surface of said nose, the portion of said wire extending from the adjacent side of said chamber to said holder lying behind said finger, and such needle acting to lay its strand alongside said wire portion and also behind said finger, means for rotating said shaft to cause said nose to engage said wire portion and said strand at a point between the axis of said shaft and said chamber and to produce a loop of said wire portion and said strand enclosing said nose and said finger, and further to engage, between said nose and said finger and traversing said loop, a part of said wire portion and said strand located between said loop and said holder, and means acting after such last-named engagement has been produced to retract said rod, whereby said finger engages an edge of said opening, is thrown into cooperative engagement with said last-named part of said wire portion and said strand, and is moved toward the root of the inner surface of said nose to draw said wire part positively through said loop.

4. Wire tying mechanism comprising a bill hook adapted to be rotated about an axis and having a nose turned out of said axis and including an inner curved surface, a finger associated with the inner curved surface of said nose, a reciprocator mounted to rotate on said axis with said bill hook and for reciprocation longitudinally of said axis relative to said bill hook, said reciprocator being operatively connected to said finger for movement relative thereto and acting, upon movement in one direction relative to said bill hook, to force the end of said finger to scrape along said inner curved surface of said nose from a point near the extremity of said nose toward the root of said nose, and power means for rotating said bill hook and reciprocator and for reciprocating said reciprocator.

5. For use with a baling machine including a baling chamber, means for grasping portions of the ends of a wire extending around a bale in such a baling chamber in the form of a loop, a bill hook formed of two relatively movable parts, means for rotating said bill hook while in engagement with the ends of the wire inwardly of the grasped portions thereof to form a bight therein, means for spreading the parts to receive portions of the ends of the wire, means for closing the parts to retain the last-mentioned wire portions, and means for moving said parts relatively longitudinally to draw said last-mentioned portions actively through said bight while said parts remain in closed position to hold said bight upon said bill hook.

6. For use with a baling machine including a baling chamber, means for grasping portions of the ends of a wire extending around a bale in such a baling chamber in the form of a loop, a bill hook comprising an element rotatable about an axis and having a nose turned out of said axis, means for rotating said element about said axis to cause said nose to engage said wire to form a double bight therein inwardly of the grasped portions thereof, a finger operatively associated with said nose, means movable relative to said element and operable, during rotation of said element and after formation of such bight, to spread said finger from said nose to receive portions of the ends of said wire therebetween in traversing relation to said bight, said means being operable thereafter to swing said finger into engagement with said nose adjacent the outer end thereof in retaining relation to said last-mentioned wire portions, and to move said finger from the outer end of said nose toward the root thereof to draw said last-mentioned wire portions positively through said bight, and means engaging said finger, during such last-mentioned movement thereof, and holding said finger positively in engagement with said nose.

7. In a wire-tying mechanism, a bill hook comprising an element rotatable about an axis and having a nose turned out of said axis, means for rotating said element about said axis, a finger operatively associated with said nose, a reciprocator mounted to rotate on said axis with said bill hook and reciprocable longitudinally of said axis relative to said bill hook, said reciprocator being operatively connected to said finger for movement relative thereto, means operable during rotation of said element to shift said reciprocator in one direction relative to said bill hook, means cooperable with said finger, upon such shifting of said reciprocator, to spread said finger from said nose, and means operable thereafter to shift said reciprocator in the opposite direction to swing said finger into engagement with said nose adjacent the outer end of said nose and to move the same, while in such engagement, longitudinally of said nose toward the root thereof.

8. For use with a baling machine including a baling chamber, means for grasping portions of the ends of a baling wire extending around a bale in such a baling chamber in the form of a loop, and means for forming a tie in the ends of the wire inwardly of the grasped portions thereof including mechanically-driven rotating means engageable with said wire ends for forming a bight in the ends of the wire, means for shifting said grasping means during rotation of said rotating means to lay portions of the wire ends across said bight, and means reciprocable relative to said rotating means for engaging and positively drawing the last-named wire portions through the bight.

9. Wire tying mechanism comprising a bill hook including a hollow shaft and a nose turned out of the axis of said shaft, said shaft being provided with an opening adjacent the root of the inner surface of said nose, a rod reciprocably mounted in said hollow shaft, a finger pivotally mounted on said rod and projecting through said opening into cooperative relation with said inner surface of said nose, means for rotating said shaft, and actuating means for said rod acting, during rotation of said shaft, to project said rod, thereby swinging the free end of said finger away from said nose, and thereafter to retract said rod, thereby engaging the rear surface of said finger with an edge of said opening and throwing said finger end into cooperative engagement with said surface of said nose adjacent the outer end thereof and dragging said finger, while in such engagement, toward the root of said surface.

GRIFFITH L. BURKETT.

REFERENCES CITED

The following references are of record in the file of this patent:

UNITED STATES PATENTS

| Number | Name | Date |
|---|---|---|
| 231,448 | Randall | Aug. 24, 1880 |
| 401,013 | Davis | Apr. 9, 1889 |
| 2,063,439 | Johnson et al. | Dec. 8, 1936 |
| 2,405,688 | Crumb | Aug. 13, 1946 |